Aug. 21, 1956 H. H. HAMILTON ET AL 2,759,621
OUTLET BOX AND MEANS FOR MOUNTING SAME
Filed May 9, 1951 2 Sheets-Sheet 1

Inventors:
Harry H. Hamilton
Andrew R. Barr
By: Harbaugh and Harricks
attys.

Aug. 21, 1956   H. H. HAMILTON ET AL   2,759,621
OUTLET BOX AND MEANS FOR MOUNTING SAME
Filed May 9, 1951   2 Sheets-Sheet 2
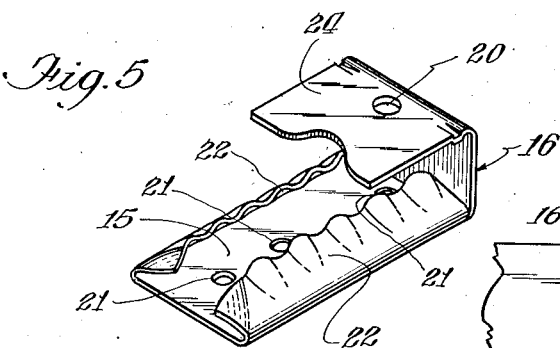
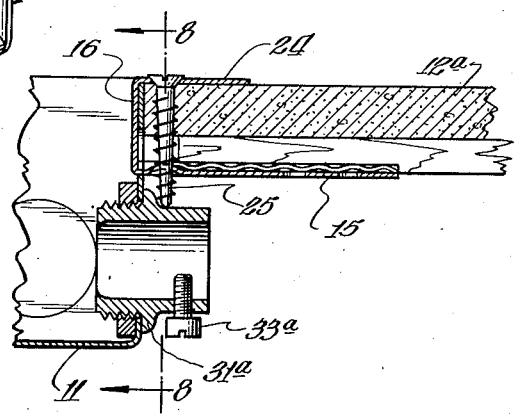
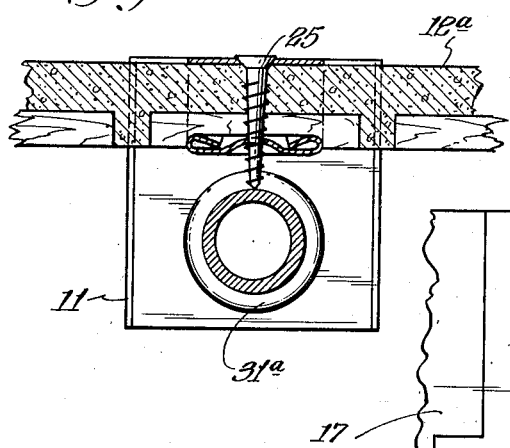
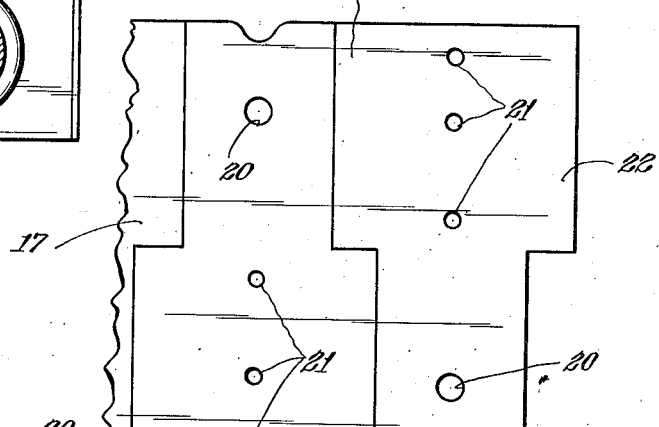
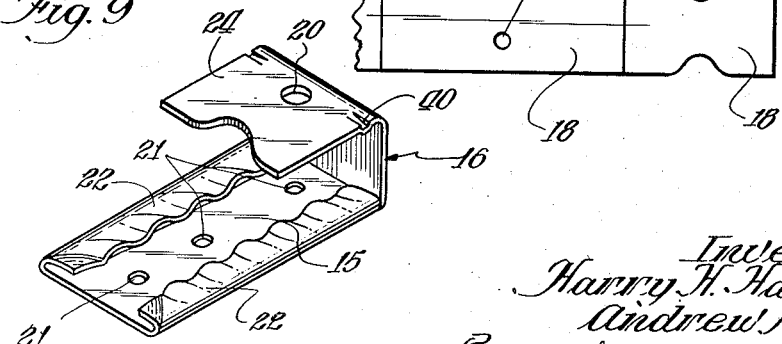
Inventors:
Harry H. Hamilton
Andrew R. Barr
By: Harbaugh and Hinrichs
Atty's.

United States Patent Office 2,759,621
Patented Aug. 21, 1956

2,759,621

OUTLET BOX AND MEANS FOR MOUNTING SAME

Harry H. Hamilton, Franklin Park, and Andrew R. Barr, Chicago, Ill.

Application May 9, 1951, Serial No. 225,322

10 Claims. (Cl. 220—3.6)

This invention relates generally to electrical outlet or junction boxes and more particularly to an improved box and mounting means.

This application is a continuation-in-part of our earlier application for improvements in Outlet Box and Means for Mounting Same, filed January 20, 1951, Serial No. 207,029, now Patent No. 2,692,697, reference to which is hereby made.

As described in that application it is desirable to install building wiring in the form of conduit or armored cable in which the outer sheath or covering is grounded. The sheath is in turn connected to the outlet boxes which serve to ground the cover plates and circuit element such as switches and receptacles.

In times of metal shortages it is desirable to make the outlet boxes out of non-conducting materials such as plastics. When this is done, however, the circuit elements and cover plates are not grounded. Moreover, even when metal boxes are used, a layer of paint or a loose mechanical connection may prevent the proper grounding of the cover plate or receptacle.

Accordingly one important object of this invention is to provide a mounting arrangement in which the outlet box is bypassed in the grounding circuit so that heavily painted or plastic boxes may be employed and still have the receptacle properly grounded.

Although the wall engaging clips which support the boxes disclosed in the earlier application perform their functions very well, certain of the clips disclosed work better with plasterboard walls while others work better with plaster lath walls. Consequently another important object of this invention is to provide an improved mounting arrangement wherein a single type clip may be used with equal success either with thick plastered walls or with relatively thin plasterboard or plywood walls, the clips being simple to use and fabricate and being constructed in such fashion as to be locked against lateral movement with respect to the wall and the box once installed and drawn together.

Another object is to provide an arrangement especially suited for mounting boxes in finished walls in that the mounting is such that the front of the box is held flush with the face of the wall regardless of the thickness of plaster, wallboard or other covering material.

Another object is to provide a mounting arrangement wherein the opening made through the plaster can be the same size as the box or almost as large as the cover plate without impairing the solidity of the support.

A further object is to provide a mounting which strengthens the wall rather than weakens it, most conventional mountings actually weakening the wall in which they are installed.

A further object of the invention is to provide an outlet box mounting which extends from the box along the back of the wall facing for a substantial distance and is constructed to be very rigid throughout, yet conforms to, and takes sharp purchase with, the back of the wall under a clamping action which can be established and determined from the front of the box.

A further object is to provide a simplified mounting arrangement which may be readily fabricated, having a minimum of parts and which may be simply and easily installed without special tools or skill being required.

Other objects and advantages of the outlet box and mounting means of this invention will present themselves to those familiar with the art on reading the following specification in conjunction with the drawings and the appended claims.

In the drawings:

Fig. 5 is a perspective view of the preferred form of clip;

Fig. 6 is a plan view of a strip of sheet metal showing the maner in which the clips are punched;

Fig. 7 is a view similar to Fig. 3 showing the manner in which a box is mounted in a thick plaster wall;

Fig. 8 is a section taken on line 8—8 of Fig. 7, and

Fig. 9 is a perspective view of a clip which has been initially bent for use in a thick plaster wall.

The outlet box and mounting embodying the invention are similar to those disclosed in our earlier application in that the box is provided with slots or openings in the side walls spaced from the front edge where they receive U-shaped wall clamping clips. These clips are attached to the box and wall by inserting the longer leg of each through the slots and pushing them laterally behind the wall. The shorter leg of each clip passes over the front edge of the box and in front of the wall. When in place, the two legs of each clip are drawn together with a screw which passes through the short leg and threads into the long leg to establish a clamping action which fastens the box to the wall.

In the present invention the clip is characterized by edges of the long leg being folded to form spacing flanges which are crimped along the edge to provide sharp ridges that dig into the back surface of a wall under the clamping pressure exerted by the legs as strengthened by the beam-like construction of the flanges.

Figure 1:
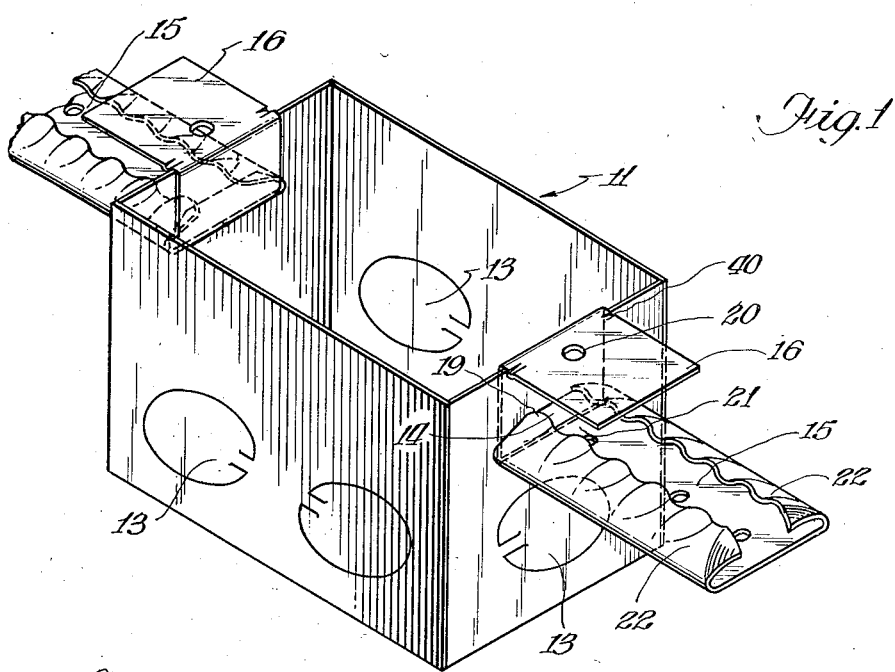
Fig. 1 is a perspective view of an outlet box provided with the mounting clips of this invention.
Figure 2:
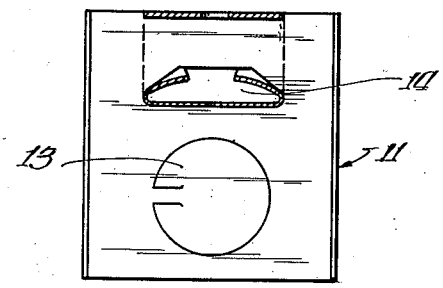
Fig. 2 is an end view of the box, the clip being shown in section.
Figure 3:
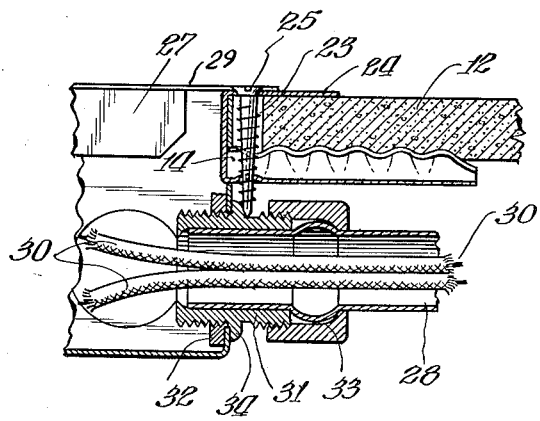
Fig. 3 is a section through a box installed in a plaster board wall, the cover plate being removed, and the section being taken along the middle of the clip.

The preferred embodiment of the box 11 and mounting clips is shown in Fig. 1. In Figs. 2 and 3 this box is shown mounted in a plasterboard wall 12, while in Figs. 7 and 8 it is shown mounted in the thicker plaster and lath wall.

The box 11 is rectangular in shape having an open front and conventional knockout plugs 13 which are broken out so that the cable or conduit may be run into the box. Actually the box 11 may be any other conventional shape, even round, but the widely used rectangular form is preferred and has been shown in the drawings.

At each end of the box a trapezoidal opening or slot 14 is provided which receives the longer or inner leg 15 of the clip 16 when the clip is inserted into position, as shown. The clips 16 are preferably formed from lightweight, galvanized sheet metal which may be stamped from a long strip 17, as shown in Fig. 6, and bent to the shape shown in Fig. 5. It is preferred to stamp the blanks 18 from the strip two at a time, and during the stamping to punch the holes indicated at 20 and 21.

The projecting side portions 22, whose width is approximately one-third of the width of the finished clip, are crimped or corrugated along the edge and bent inwardly at an angle of about 30 degrees to the shape shown.

The sectional contour of the longer inner leg 15 of the clip 16 is approximately the same as that of the trapezoidal openings 14 so that the clips may be readily installed in the position shown in Fig. 1 after the box has been inserted in an opening 23 in the wall 12 (Fig. 3), except at the end 19 nearest the box, the crimped edge is preferably slightly larger than the opening contour to provide a snap or latching action to hold the clip in place both in handling and shipping the box and after mounting the box in place.

On examination of Fig. 3 it will be noted that the distance between the open front of the box 11 and the top of the opening 14 is substantially the same as the thickness of the plasterboard 12. Thus when the clips 16 are inserted the high portions of the corrugations 22 engage the inner surface of the plasterboard 12 while the short outer legs 24 engage the front surface.

To draw the two legs tightly together conventional flat head screws 25, preferably of the sheet metal type, are provided. These screws project through the large holes 20 and are threaded into the innermost of the small holes 21, the large holes 20 being larger than the major thread diameter and the smaller holes 20 being slightly smaller than the minor thread diameter. Thus when the screws 25 are tightened the legs 15 and 24 are drawn together. This causes the corrugations 22 to dig into the plasterboard, firmly securing the clips 16 and box 11 to the wall 12. Since the corrugations dig into the board 12 the clips will not move laterally under expected stresses to which the box will be subjected once the screws have been tightened. Moreover, since the corrugated portions 22 are on opposite sides of the clip, the clips 16 are held solidly against tilting sideways.

The screws 25 perform an additional function in that they serve to ground the circuit element such as the receptacle 27 (shown in Fig. 3) through the metal supporting strap 29 of the receptacle to the conduit 28 housing the wires 30. This thin wall conduit terminates in a bushing 31 which is supported in the knockout opening 13 in the end of the box 11 by a nut 32. The conduit 28 is held in the bushing by a coupling nut 33, and the bushing 31 is provided with a rounded flange 34 which is engaged by the side of the thread on the screw 25.

The flange 34 is rounded so that although it is initially engaged by the point of the screw, it causes the screw to deviate slightly from its normal course as it is threaded in so as not to check its inward movement and maintain contact with the side of the screw. Thus regardless of the depth to which the screw is driven it will make electrical contact with the flange 34.

The cocking effect exerted by the bushing on the screw, in addition to improving the electrical connection, also serves to lock the screw against loosening and to pull the clip outwardly to the limit of travel.

Figure 4:
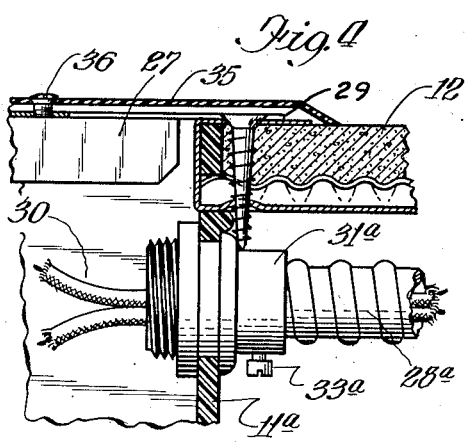
Fig. 4 is a section similar to Fig. 3, but showing a plastic box with both a receptacle and cover plate installed.

In Fig. 4 a plastic receptacle 11a is shown which is connected to a BX type armored cable 28a. The adaptor 31a differs from the adaptor 31 in that a locking screw 33a is provided instead of the cap nut 33 to hold the cable sheath in place. Thus despite the fact that the box 11a is formed of a non-conducting material, the element 27 supported by the screws 25 is grounded to the armored sheath. The conventional cover plate 35 is grounded to the element 27 by the screw 36 which holds the plate in place.

The procedure in mounting the box 11 in a finished wall is extremely simple. The first step is to cut an opening in the plasterboard 12 slightly larger than the box 11. The opening need not be carefully cut for it may vary in size from a minimum size just sufficient to accommodate the box to a maximum only slightly smaller than the size of the cover plate 35. The conduit 28 or cable 28a may then be connected to the box using an appropriate bushing and the box pushed into place in the opening. The two clips 16 are then pushed into the slots 14 from inside the box 11 so that the long legs 15 thereof project behind the wall 12 while the short legs 24 project in front of the wall. The clips 16 then hold the box 11 in position in the opening and the wires 30 may be connected to the circuit element 27. When this has been done the element is supported in the position shown in Fig. 3 and the screws 25 are inserted through the openings in the ends of the mounting strap 29 and driven into the openings 20 and 21 in the clips 16. This draws the legs of the clips together, secures the element 27 in place and grounds the mounting strap 29 directly to the bushing 31.

The degree of tightness with which the clips 16 hold the box 11 prior to tightening the screws 25, of course, depends on the thickness of the wall board and the unstressed distance between the front and rear legs of the clips. In the event that tighter initial securement is desired it is a simple matter for the person installing the box to bend the legs of the clips 16 closer together prior to inserting the clips in the slots 14. If some time is to elapse before the wiring is to be completed it may be desirable to install the screws 25 without first installing the circuit element 27. When this is done the screws are removed when the time comes to complete the wiring and install the element 27. Once the element is in place the cover plate 35 is attached in the conventional manner, its ends projecting outwardly just beyond the front legs of the clips 16.

Once the clips 16 have been pushed all the way out they remain in that position even though not clamped by the screws 25. This is accomplished by offsetting the sides of the upper legs slightly as indicated at 40 in Fig. 1. These offset portions serve as detent like stops to hold the clips in position both before and after the screws 25 are installed.

The above decsribed procedure may also be varied in respect to the time at which the cable 28a or conduit 28 is installed. If the space behind the wall 12 is accessible from the rear it may be desirable to mount the box first and then run the conduit or cable. When this procedure is followed it is preferable to install the bushing 31 prior to tightening the screws 25. Other modifications of the procedure may, of course, be made if desired to solve problems presented by particular installation jobs.

Figs. 7–9 show the manner in which the clip of the invention is used to support a box in a plaster and lath wall 12a. The clip and box are preferably exactly the same as those previously described, and like numerals have been used in the drawings.

The only difference in the assembly is that the corrugated side portions 22 of the clip 16 are shown as bent down so as to lie flat against the body of the inner leg 15 as shown in Fig. 9. This is very easily done by the electrician on the job by using either a pair of pliers or a hammer. The effect of bending down the sides 22 is to increase the distance between the front and rear legs of the clip 16 to substantially the same thickness of the plaster-lath wall 12a. The corrugated edges still remain effective.

A modification which has proved workable although not as convenient as the preferred embodiment is to provide frangible side portions on the inner leg of the clip which may be broken off (not shown) instead of bent down when thick walls are encountered.

Once the side portions 22 have been bent down the installation procedure is exactly the same as that employed with thinner walls. Although they are not frequently encountered, walls of intermediate thickness present no problem for the sides 22 may be bent down any desired degree to achieve a perfect fit. Moreover even if the initial fit is too loose the tightening of the screws 25 will draw the legs into the proper position.

Similarly if the initial fit is too tight the legs will usually spread somewhat as the clips are pressed in to accommodate automatically for the different thickness.

The advantages of using a corrugated shape for the side portions are not readily apparent, but by using the form good locking is achieved whether the sides 22 are bent down as in Fig. 9 or left in their original position. When the clips are to be used only in thin walls the same effect as the corrugations may be achieved by providing sawtooth edges on the side portions which will dig into the wall. However, if the sides are bent down the edges no longer can dig in. In some cases, it has proved desirable to utilize both the sawtooth edge and the corrugations but the straight cut corrugated edge lends itself to manufacturing economies.

The small holes 21 in the outer end of the longer clip legs 15 are useful in nailing the clips 16 to studding or to laths when the normal installation procedure cannot be followed. The semi-circular cutouts in the front legs 24 provide clearance when the clips are to be used with the circuit elements or cover plates which are supported beyond the edges of the box as are sometimes encountered.

In shipment, the clips are inserted from the outside to bring the legs of the clips within the confines of the box. The screw is mounted in place but not tightened. Thus the box is a unit as far as packaging is concerned and there is little danger of the parts being lost or overlooked.

From the foregoing description it will be readily apparent how the box and clip of this invention fulfill the objects set forth therein and constitute a superior mounting arrangement.

Various changes or modifications in addition to those set forth herein or suggested in our earlier application may be made without departing from the spirit of this invention whose scope is commensurate with the following claims.

What is claimed is:

1. In combination an outlet box having an open front and a pair of slots in opposite walls spaced from the open front, a U-shaped clip received in each of said slots with the legs of the clip extending outwardly from the wall of the box, the front leg of each clip being in substantially the same plane as the open front of said box and the other being spaced rearwardly therefrom, said other leg having integral corrugated side portions bent inwardly at an acute angle, and a clamping screw for each of said clips extending through an enlarged hole in the front leg of the clip and threadably received in a hole in the rear leg of the clip so that said legs are displaced towards each other when the screw is tightened to secure the box in a wall.

2. In combination an outlet box having an open front and a pair of slots in opposite walls spaced from the open front, unitary U-shaped clips received in each of said slots with the legs of the clips extending outwardly from the sides of the box, one leg of each clip being in substantially the same plane as the open front of said box, and means for clamping each of said clips so that said legs may be drawn towards each other when the means is tightened to support the box in a wall, the other leg of each clip having inwardly bent side portions thereon at an acute angle thereto for engaging the rear face of a wall.

3. In combination an outlet box having an open front and a pair of slots in opposite walls spaced from the open front, U-shaped clips received in each of said slots with the legs of the clips extending outwardly from the sides of the box, one leg of each clip being in substantially the same plane as the open front of said box, and means for clamping each of said clips so that said legs may be drawn towards each other when the means is tightened to support the box in a wall, the other leg of each clip having inwardly bent side portions thereon for engaging the rear face of a wall, the clip side portions being corrugated so as to dig into the wall when the clamping means is effective.

4. In combination an outlet box having an open front and a pair of slots in opposite sidewalls spaced from the open front, U-shaped clips received in each of said slots with the legs of the clips extending outwardly from the sides of the box, one leg of each clip being in substantially the same plane as the open front of said box, a clamping screw for each of said clips extending through an enlarged hole in the front leg of the clip and threadably received in an opening in the rear leg of the clip so that said legs may be drawn together when the screw is tightened, and side portions on the opposite sides of each of said clips for engaging the rear face of a wall in which the box is supported, the side portions being bent inwardly at an acute angle to lessen the effective width of the clips.

5. The combination of claim 4 the side portions being corrugated.

6. In combination an outlet box having an open front, a unitary wall engaging clip having two substantially parallel legs, means on a wall of said box for attaching said clip to said box with both legs extending outwardly from said wall of said box, one leg being substantially flush with said open front and the other leg being spaced rearwardly therefrom, means for clamping said legs together to secure said box in a wall and side portions on one of said legs for lessening the effective distance between said legs, said side portions being disposed at an acute angle thereto.

7. A supporting clip for an outlet box comprising a unitary member having two right angle bends therein defining a front leg, an interconnecting portion and a rear leg, one of said legs having integral yieldable side portions thereon bent inwardly towards each other to make an angle less than an angle of 45° with the rear leg to rigidify the rear leg against deflection and lessen the effective distance between said legs.

8. A supporting clip for an outlet box comprising a unitary member having two right angle bends therein defining a short front leg, an interconnecting portion and a substantially longer rear leg, said rear leg having integral yieldable side portions thereon bent towards each other at an appreciably acute angle to said rear leg to rigidify the rear leg against deflection and lessen the effective distance between said legs.

9. A supporting clip for an outlet box comprising a unitary member having two right angle bends therein defining a front leg, an interconnecting portion and a rear leg, one of said legs having integral yieldable side portions thereon bent inwardly towards each other to make an angle less than an angle of 45° with the rear leg to rigidify the rear leg against deflection, said side portions being crimped along the edge to provide sharp ridges.

10. A supporting clip for an outlet box comprising a unitary member having two right angle bends therein defining a front leg, an interconnecting portion and a rear leg, one of said legs having integral yieldable side portions thereon bent inwardly towards each other to make an angle less than an angle of 45° with the rear leg to rigidify the rear leg against deflection, said side portions being corrugated.

References Cited in the file of this patent

UNITED STATES PATENTS

| | | |
|---|---|---|
| 1,722,773 | Stewart | July 30, 1929 |
| 1,791,264 | Chaney | Feb. 3, 1931 |
| 1,791,748 | Bernet | Feb. 10, 1931 |
| 1,818,317 | Gilmore | Aug. 11, 1931 |
| 1,880,081 | Frederickson | Sept. 27, 1932 |
| 1,987,446 | Knoderer | Jan. 8, 1935 |
| 2,031,685 | Bomber | Feb. 25, 1936 |
| 2,039,550 | Norton | May 5, 1936 |
| 2,334,799 | Thompson | Nov. 23, 1943 |
| 2,514,176 | Borkowshi | July 4, 1950 |
| 2,533,867 | Zink | Dec. 12, 1950 |